United States Patent
Cheng et al.

(10) Patent No.: US 12,393,734 B2
(45) Date of Patent: Aug. 19, 2025

(54) UNLOCKABLE CONTENT CREATION PORTAL

(71) Applicant: Snap Inc., Santa Monica, CA (US)

(72) Inventors: Jin Cheng, New York, NY (US); Kevin Sarabia Dela Rosa, Seattle, WA (US)

(73) Assignee: SNAP INC., Santa Monica, CA (US)

( * ) Notice: Subject to any disclaimer, the term of this patent is extended or adjusted under 35 U.S.C. 154(b) by 200 days.

(21) Appl. No.: 18/165,747

(22) Filed: Feb. 7, 2023

(65) Prior Publication Data

US 2024/0265145 A1  Aug. 8, 2024

(51) Int. Cl.
*G06F 21/62* (2013.01)
*G06F 21/31* (2013.01)
*G06F 21/54* (2013.01)

(52) U.S. Cl.
CPC ............ *G06F 21/629* (2013.01); *G06F 21/31* (2013.01); *G06F 21/54* (2013.01)

(58) Field of Classification Search
CPC ........ G06F 21/629; G06F 21/31; G06F 21/54; H04L 63/105; H04L 63/08
See application file for complete search history.

(56) References Cited

U.S. PATENT DOCUMENTS

| | | | |
|---|---|---|---|
| 5,577,135 A | | 11/1996 | Grajski et al. |
| 5,862,376 A * | | 1/1999 | Steele, Jr. ............. G06F 9/4401 |
| | | | 718/107 |
| 6,182,115 B1 * | | 1/2001 | Cuomo ..................... G06F 9/52 |
| | | | 709/204 |
| 6,275,935 B1 * | | 8/2001 | Barlow ............... G06F 21/6209 |
| | | | 713/168 |
| 7,046,851 B2 | | 5/2006 | Keaton et al. |
| 8,493,353 B2 | | 7/2013 | Blanchflower et al. |
| 8,555,378 B2 * | | 10/2013 | Bowman ............. G06F 21/6218 |
| | | | 726/21 |

(Continued)

FOREIGN PATENT DOCUMENTS

| | | |
|---|---|---|
| CN | 101203170 | 6/2008 |
| CN | 104751475 | 7/2015 |

(Continued)

OTHER PUBLICATIONS

"International Application Serial No. PCT US2020 022343, International Search Report mailed May 28, 2020", 3 pgs.

(Continued)

*Primary Examiner* — Aravind K Moorthy
(74) *Attorney, Agent, or Firm* — SCHWEGMAN LUNDBERG & WOESSNER, P.A.

(57) ABSTRACT

Embodiments herein describe a portal system for maintaining a user portal that is used for managing and generating scannable images. The scannable images may be linked to different types of content such as website URLs, social media platform user profiles, and augmented reality experiences. The user portal is accessible from a social media platform via user login credentials. Upon entering their user login credentials, the portal system authenticates the user login credentials and displays a list existing scannable images that are stored in association with the user portal. The user may modify one or more aspects of the existing scannable images or may generate a new scannable image from the user interface.

20 Claims, 11 Drawing Sheets

(56) References Cited

U.S. PATENT DOCUMENTS

| | | | |
|---|---|---|---|
| 8,671,458 B2* | 3/2014 | Cohen | G06F 21/10 726/28 |
| 8,719,857 B1* | 5/2014 | Ellis | H04N 21/4532 725/38 |
| 9,110,541 B1* | 8/2015 | Zhou | G06F 3/017 |
| 9,272,208 B1* | 3/2016 | LeTourneau | A63F 13/60 |
| 9,280,560 B1 | 3/2016 | Dube et al. | |
| 9,424,461 B1 | 8/2016 | Yuan et al. | |
| 9,467,848 B1* | 10/2016 | Song | G06F 21/629 |
| 9,507,954 B2* | 11/2016 | Tessman, Jr. | G06F 21/31 |
| 9,684,941 B2 | 6/2017 | Filler | |
| 9,720,934 B1 | 8/2017 | Dube et al. | |
| 9,830,631 B1 | 11/2017 | Dhua et al. | |
| 9,892,242 B1* | 2/2018 | Hodge | G06F 21/121 |
| 9,954,996 B2* | 4/2018 | Christie | H04M 1/72436 |
| 10,149,958 B1 | 12/2018 | Tran et al. | |
| 10,257,202 B1* | 4/2019 | Jiang | G06F 21/313 |
| 10,282,914 B1 | 5/2019 | Tran et al. | |
| 10,467,147 B1* | 11/2019 | Ahmed | H04W 4/021 |
| 10,503,494 B1* | 12/2019 | Robinson | G06F 8/35 |
| 10,606,824 B1 | 3/2020 | Fire et al. | |
| 10,636,062 B1 | 4/2020 | Mossoba et al. | |
| 10,681,063 B1* | 6/2020 | Silva | G06F 21/577 |
| 10,699,124 B1 | 6/2020 | Herzberg et al. | |
| 10,798,574 B1* | 10/2020 | Indurkar | H04W 12/03 |
| 10,970,549 B1* | 4/2021 | Krishnan | G06V 20/20 |
| 11,017,233 B2 | 5/2021 | Charlton et al. | |
| 11,182,944 B1* | 11/2021 | Kondoh | G06F 3/012 |
| 11,216,581 B1* | 1/2022 | Arikapudi | G06F 21/31 |
| 11,341,728 B2 | 5/2022 | Hu et al. | |
| 11,386,625 B2 | 7/2022 | Hu et al. | |
| 11,397,823 B1* | 7/2022 | Argenti | G06Q 30/01 |
| 11,410,215 B1* | 8/2022 | Goetz | G06Q 30/0609 |
| 11,410,230 B1* | 8/2022 | Olson | G06F 21/6245 |
| 11,417,154 B1* | 8/2022 | Moeykens | G06F 21/32 |
| 11,483,156 B1* | 10/2022 | Etwaru | G06F 21/6218 |
| 11,562,014 B1 | 1/2023 | Dermu | |
| 11,620,829 B2 | 4/2023 | Hu et al. | |
| 11,651,019 B2 | 5/2023 | Charlton et al. | |
| 11,775,132 B1* | 10/2023 | McDannald | G06F 3/04815 715/741 |
| 11,922,396 B1* | 3/2024 | Blumenthal | G06Q 20/3223 |
| 11,922,445 B1* | 3/2024 | Aery | G06Q 30/0207 |
| 2004/0100483 A1 | 5/2004 | Russell | |
| 2004/0189439 A1* | 9/2004 | Cansino | H04L 67/025 340/5.2 |
| 2005/0015601 A1* | 1/2005 | Tabi | G06F 21/6227 713/182 |
| 2007/0028104 A1* | 2/2007 | Cohen | H04L 9/3271 713/170 |
| 2007/0043810 A1* | 2/2007 | Dionne | H04L 63/08 709/203 |
| 2008/0030575 A1 | 2/2008 | Davies et al. | |
| 2008/0080012 A1 | 4/2008 | Mock et al. | |
| 2009/0033679 A1* | 2/2009 | Borrel | G06T 15/20 345/629 |
| 2009/0064321 A1* | 3/2009 | Dick | H04L 63/107 726/21 |
| 2009/0133037 A1* | 5/2009 | Allen | G06F 9/526 719/314 |
| 2009/0293012 A1 | 11/2009 | Alter et al. | |
| 2009/0322671 A1 | 12/2009 | Scott et al. | |
| 2010/0049975 A1* | 2/2010 | Parno | H04L 63/1483 713/168 |
| 2010/0255813 A1* | 10/2010 | Belrose | H04W 12/48 455/411 |
| 2011/0115816 A1 | 5/2011 | Brackney | |
| 2012/0009896 A1* | 1/2012 | Bandyopadhyay | H04M 1/724631 715/764 |
| 2012/0284297 A1* | 11/2012 | Aguera-Arcas | G06F 21/629 713/1 |
| 2013/0080172 A1 | 3/2013 | Talwar et al. | |
| 2013/0201182 A1 | 8/2013 | Kuroki et al. | |
| 2013/0202213 A1 | 8/2013 | Adamek et al. | |
| 2013/0346297 A1* | 12/2013 | Zuck | G06Q 30/04 705/39 |
| 2014/0029798 A1 | 1/2014 | Flynn et al. | |
| 2014/0078144 A1 | 3/2014 | Berriman et al. | |
| 2014/0109184 A1* | 4/2014 | Parker, II | H04L 49/252 726/3 |
| 2014/0130182 A1* | 5/2014 | Yackanich | G06Q 30/0269 726/27 |
| 2014/0187200 A1* | 7/2014 | Reitter | H04W 4/30 455/410 |
| 2014/0195650 A1 | 7/2014 | Kelsen | |
| 2014/0214515 A1* | 7/2014 | Quirk | G06Q 30/0225 705/14.26 |
| 2014/0247207 A1* | 9/2014 | Pahud | G06F 1/1698 345/156 |
| 2014/0267120 A1* | 9/2014 | Zhang | G06F 3/0488 345/173 |
| 2014/0283135 A1* | 9/2014 | Shepherd | G06F 3/04817 726/29 |
| 2014/0289843 A1* | 9/2014 | Chiang | G06F 3/04886 726/19 |
| 2014/0317012 A1 | 10/2014 | Can et al. | |
| 2014/0340423 A1 | 11/2014 | Taylor et al. | |
| 2014/0362120 A1* | 12/2014 | Wohl | G06T 11/206 345/661 |
| 2015/0070347 A1 | 3/2015 | Hofmann et al. | |
| 2015/0153981 A1* | 6/2015 | Iwasaki | H04N 1/00344 358/1.14 |
| 2015/0206343 A1 | 7/2015 | Mattila et al. | |
| 2015/0242444 A1 | 8/2015 | Campbell et al. | |
| 2015/0262036 A1 | 9/2015 | Song et al. | |
| 2015/0310667 A1 | 10/2015 | Young et al. | |
| 2015/0348329 A1 | 12/2015 | Carre et al. | |
| 2015/0350177 A1* | 12/2015 | Sharp | G06Q 20/321 726/6 |
| 2015/0350207 A1* | 12/2015 | Kim | H04W 12/06 713/170 |
| 2016/0014196 A1* | 1/2016 | Azulay | H04L 63/08 726/3 |
| 2016/0048665 A1* | 2/2016 | Alshinnawi | G06F 21/36 726/19 |
| 2016/0070895 A1* | 3/2016 | Harjanto | H04L 63/08 726/30 |
| 2016/0098619 A1 | 4/2016 | Gaidon et al. | |
| 2016/0189000 A1 | 6/2016 | Dube et al. | |
| 2016/0294799 A1* | 10/2016 | Miller | H04N 21/43072 |
| 2016/0350548 A1* | 12/2016 | Lewis | G06F 3/04842 |
| 2016/0358230 A1* | 12/2016 | Wilson | G06Q 30/0277 |
| 2016/0364394 A1* | 12/2016 | Bostick | G06F 16/9537 |
| 2016/0364590 A1* | 12/2016 | Wadley | H04L 63/10 |
| 2016/0378967 A1* | 12/2016 | Li | G06F 21/31 726/19 |
| 2017/0024384 A1 | 1/2017 | Kant | |
| 2017/0061469 A1* | 3/2017 | Garrity | G06Q 50/01 |
| 2017/0323481 A1 | 11/2017 | Tran et al. | |
| 2017/0372046 A1* | 12/2017 | Thomee | H04L 63/0442 |
| 2018/0053150 A1* | 2/2018 | Ahsan | G06Q 30/0623 |
| 2018/0069937 A1 | 3/2018 | Kolleri | |
| 2018/0082430 A1 | 3/2018 | Sharma et al. | |
| 2018/0088787 A1* | 3/2018 | Bereza | G06F 3/04815 |
| 2018/0114087 A1 | 4/2018 | Kamen et al. | |
| 2018/0137268 A1* | 5/2018 | Sawant | G06F 21/36 |
| 2018/0152838 A1* | 5/2018 | Adams | G06F 21/45 |
| 2018/0159971 A1* | 6/2018 | Yang | G06F 3/04842 |
| 2018/0164995 A1* | 6/2018 | Czupi | G06F 3/0486 |
| 2018/0165888 A1 | 6/2018 | Duan et al. | |
| 2018/0184038 A1 | 6/2018 | Li | |
| 2018/0255947 A1* | 9/2018 | Wilkinson | G06T 11/00 |
| 2018/0260660 A1 | 9/2018 | Gopalan et al. | |
| 2018/0286081 A1 | 10/2018 | Koperski et al. | |
| 2018/0350119 A1* | 12/2018 | Kocharlakota | G06F 3/012 |
| 2019/0034667 A1* | 1/2019 | Zhou | G06V 40/1376 |
| 2019/0096135 A1 | 3/2019 | Dal Mutto et al. | |
| 2019/0102922 A1 | 4/2019 | Gum | |
| 2019/0207678 A1 | 7/2019 | Aoyama et al. | |
| 2019/0236167 A1 | 8/2019 | Hu et al. | |
| 2019/0251570 A1* | 8/2019 | Song | G06Q 20/40145 |

(56) References Cited

U.S. PATENT DOCUMENTS

| | | | |
|---|---|---|---|
| 2019/0253700 A1* | 8/2019 | Tornéus | G02B 27/0093 |
| 2019/0311335 A1* | 10/2019 | Greiner | G06F 21/121 |
| 2019/0347181 A1* | 11/2019 | Cranfill | G06F 11/3013 |
| 2019/0362154 A1 | 11/2019 | Moore et al. | |
| 2019/0392058 A1 | 12/2019 | Konow Krause et al. | |
| 2020/0050324 A1* | 2/2020 | Gavara | H04M 1/67 |
| 2020/0074672 A1 | 3/2020 | Hoff | |
| 2020/0077144 A1* | 3/2020 | Zavesky | H04N 21/454 |
| 2020/0082668 A1 | 3/2020 | Foley et al. | |
| 2020/0090409 A1 | 3/2020 | Fink et al. | |
| 2020/0125707 A1* | 4/2020 | Lin | G06V 40/172 |
| 2020/0204739 A1* | 6/2020 | Beres | G06Q 10/101 |
| 2020/0279305 A1 | 9/2020 | Mossoba et al. | |
| 2020/0304481 A1* | 9/2020 | Rathore | H04L 63/105 |
| 2020/0311426 A1 | 10/2020 | Charlton et al. | |
| 2020/0372294 A1 | 11/2020 | Koval et al. | |
| 2021/0004589 A1 | 1/2021 | Turkelson et al. | |
| 2021/0064728 A1* | 3/2021 | Kadambala | G06F 3/04842 |
| 2021/0073543 A1 | 3/2021 | Herzberg et al. | |
| 2021/0121782 A1* | 4/2021 | Døssing | A63F 13/213 |
| 2021/0141880 A1* | 5/2021 | Pauli | G06F 3/013 |
| 2021/0152975 A1 | 5/2021 | Hohman | |
| 2021/0256498 A1 | 8/2021 | Detitta | |
| 2021/0406041 A1* | 12/2021 | Saraiya | G06F 16/9017 |
| 2021/0409539 A1* | 12/2021 | Arellano | G06F 1/1684 |
| 2022/0067580 A1* | 3/2022 | Rho | G06N 5/01 |
| 2022/0092307 A1 | 3/2022 | Charlton et al. | |
| 2022/0101011 A1 | 3/2022 | Dela Rosa et al. | |
| 2022/0101033 A1 | 3/2022 | Hu et al. | |
| 2022/0101608 A1 | 3/2022 | Hu et al. | |
| 2022/0101609 A1 | 3/2022 | Hu et al. | |
| 2022/0157047 A1 | 5/2022 | Truong et al. | |
| 2022/0167161 A1* | 5/2022 | Sheffield | H04W 12/08 |
| 2022/0179665 A1 | 6/2022 | Rathod | |
| 2022/0244989 A1* | 8/2022 | Ryan | G06F 9/468 |
| 2022/0335815 A1* | 10/2022 | Dice | G08B 27/005 |
| 2022/0382729 A1* | 12/2022 | Wu | G06F 16/2228 |
| 2022/0392132 A1* | 12/2022 | Sepulveda | G06F 3/04842 |
| 2022/0398306 A1* | 12/2022 | Misra | G06F 21/36 |
| 2022/0398887 A1* | 12/2022 | Pandey | G06K 19/0723 |
| 2023/0007350 A1* | 1/2023 | Ly | H04N 21/8586 |
| 2023/0029251 A1* | 1/2023 | Zhang | H04L 63/1458 |
| 2023/0117441 A1* | 4/2023 | McMichael | A63F 13/63 463/42 |
| 2023/0120950 A1* | 4/2023 | Ranjan | G06F 3/0416 345/173 |
| 2023/0252392 A1* | 8/2023 | Courcelle | G06Q 10/06393 705/7.39 |
| 2023/0325430 A1 | 10/2023 | Charlton et al. | |
| 2023/0401802 A1* | 12/2023 | Maschmeyer | G06F 3/04842 |

FOREIGN PATENT DOCUMENTS

| | | |
|---|---|---|
| CN | 107590453 | 1/2018 |
| CN | 108305317 | 7/2018 |
| CN | 109902190 | 6/2019 |
| CN | 111311758 | 6/2020 |
| CN | 113906413 | 1/2022 |
| WO | 2016077493 | 5/2016 |
| WO | 2020187705 | 9/2020 |
| WO | 2020205197 | 10/2020 |
| WO | WO-2024167918 A1 | 8/2024 |

OTHER PUBLICATIONS

"International Application Serial No. PCT US2020 022343, Written Opinion mailed May 28, 2020", 7 pgs.

"U.S. Appl. No. 16/814,221, Notice of Allowance mailed Jan. 25, 2021", 20 pgs.

"U.S. Appl. No. 16/949,079, Non Final Office Action mailed Jul. 8, 2021", 22 pgs.

"U.S. Appl. No. 16/949,079, Response filed Oct. 5, 2021 to Non Final Office Action mailed Jul. 8, 2021", 9 pgs.

"International Application Serial No. PCT US2020 022343, International Preliminary Report on Patentability mailed Oct. 14, 2021", 9 pgs.

"U.S. Appl. No. 16/949,077, Non Final Office Action mailed Oct. 15, 2021", 10 pgs.

"U.S. Appl. No. 16/949,077, Response filed Jan. 7, 2022 to Non Final Office Action mailed Oct. 15, 2021", 9 pgs.

"U.S. Appl. No. 17/306,179, Non Final Office Action mailed Jan. 20, 2022", 12 pgs.

"U.S. Appl. No. 16/949,079, Notice of Allowance mailed Feb. 14, 2022", 10 pgs.

"U.S. Appl. No. 16/949,079, Notice of Allowability mailed Mar. 3, 2022", 2 pgs.

"U.S. Appl. No. 16/949,077, Notice of Allowance mailed Mar. 9, 2022", 16 pgs.

"U.S. Appl. No. 17/306,179, Response filed Jun. 20, 2022 to Non Final Office Action mailed Jan. 20, 2022", 9 pgs.

"U.S. Appl. No. 16/949,074, Non Final Office Action mailed Aug. 11, 2022", 16 pgs.

"U.S. Appl. No. 17/306,179, Final Office Action mailed Aug. 25, 2022", 33 pgs.

"U.S. Appl. No. 16/949,074, Notice of Allowance mailed Nov. 18, 2022", 7 pgs.

"Response filed Oct. 27, 2022 to Non-Final Office Action dated Aug. 11, 2022.", 9 pgs.

"U.S. Appl. No. 17/306,179, Response filed Nov. 23, 2022 to Final Office Action mailed Aug. 25, 2022", 10 pgs.

"U.S. Appl. No. 17/306,179, Notice of Allowance mailed Jan. 10, 2023", 8 pgs.

"U.S. Appl. No. 16/949,074, 312 Amendment filed Feb. 14, 2023", 7 pgs.

"U.S. Appl. No. 17/378,259, Non Final Office Action mailed Feb. 22, 2023", 20 pgs.

"U.S Appl. No. 18/299,908, Preliminary Amendment filed Jun. 28, 2023", 7 pgs.

"U.S. Appl. No. 18/299,908, Non Final Office Action mailed Oct. 31, 2023", 41 pgs.

"European Application Serial No. 20718873.1, Communication Pursuant to Article 94(3) EPC mailed Dec. 22, 2023", 9 pgs.

"U.S. Appl. No. 18/299,908, Response filed Feb. 29, 2024 to Non Final Office Action mailed Oct. 31, 2023", 10 pgs.

"Korean Application Serial No. 10-2021-7034733, Notice of Preliminary Rejection mailed Apr. 12, 2024", w English Translation, 15 pgs.

"International Application Serial No. PCT US2024 014615, International Search Report mailed May 8, 2024", 4 pgs.

"International Application Serial No. PCT US2024 014615, Written Opinion mailed May 8, 2024", 11 pgs.

"U.S. Appl. No. 18/299,908, Final Office Action mailed May 24, 2024", 12 pgs.

"Korean Application Serial No. 10-2021-7034733, Response filed Jul. 12, 2024 to Notice of Preliminary Rejection mailed Apr. 12, 2024", W English Claims, 29 pgs.

Roman, Daniel, "Snapchat New AR Filters", Youtube, [Online] Retrieved from the Internet: URL:https: www.youtube.com watch?v=E8NKAPGL1HQ, (Apr. 18, 2017), 2:00 min.; 27 pgs.

U.S. Appl. No. 16/814,221 11,017,233, filed Mar. 10, 2020.

U.S. Appl. No. 17/306,179 11,651,019, filed May 3, 2021.

U.S. Appl. No. 18/299,908, filed Apr. 13, 2023.

U.S. Appl. No. 16/949,074 11,620,829, filed Oct. 13, 2020.

"U.S. Appl. No. 18/299,908, Notice of Allowance mailed Aug. 19, 2024", 8 pgs.

"U.S. Appl. No. 18/299,908, Notice of Allowance mailed Nov. 26, 2024", 7 pgs.

"U.S. Appl. No. 18/299,908, Response filed Jul. 30, 2024 to Final Office Action mailed May 24, 2024", 9 pgs.

"Korean Application Serial No. 10-2021-7034733, Final Office Action mailed Jan. 23, 2025", w/ English translation, 7 pgs.

"Korean Application Serial No. 10-2021-7034733, Request for Reexamination filed Apr. 23, 2025 to Final Office Action mailed Jan. 23, 2025", w English claims, 18 pgs.

"Application Serial No. 18 299,908, Notice of Allowance mailed Mar. 19, 2025", 7 pgs.

(56) References Cited

OTHER PUBLICATIONS

"Chinese Application Serial No. 202080039257.1, Office Action mailed May 15, 2025", W/ English Translation, 16 pgs.

* cited by examiner

UNLOCKABLE CONTENT CREATION PORTAL

TECHNICAL FIELD

Embodiments herein generally related to scannable images. More specifically, but not by way of limitation, embodiments herein describe a content creation portal for generating and modifying scannable images.

BACKGROUND

Quick response (QR) codes are usually limited to having predefined functions are not entirely customizable. This creates a non-engaging experience for users who want to share content and for those who want to access content.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Current systems users must navigate different user interfaces for each type of function associated with a scannable image (for example, a QR code). This process is inefficient and requires that the user spend a lot of their time. Providing a comprehensive list of scannable images that a user has created in a single interface so that the users can view all the scannable images that they have generated, helps against generating duplicative scannable images. This unified interface collects all scannable images associated with a user into a user portal so a user can modify, delete or deactivate any single scannable image without having to navigate multiple interfaces, and thus allows for a more efficient computer system.

The paragraphs below describe a portal system for maintaining a user portal that is used for managing and generating scannable images. The scannable images may be linked to different types of content such as website URLs, social media platform user profiles, and augmented reality experiences. The user portal is accessible from a website or mobile application of a social media platform via user login credentials. The user portal can be accessed via multiple user login credentials. For example, members of a band may each have unique login credentials and unique user accounts, but can all have access to a band user portal for their band. Each member of the band may also have a private user portal that is separate from their band user portal. For example, if the band member enters their login credentials, they can choose to select and thereby access either their band user portal, or their private user portal.

Upon entering their user login credentials to a webpage or a mobile application, the portal system will authenticate the user login credentials. The user is subsequently directed to a webpage or user interface on a mobile application that displays a list of any existing scannable images that are stored in association with the user portal. The user may modify one or more aspects of the existing scannable images or may generate a new scannable image from the webpage or user interface. For example, the user can modify the image, the type of content and the data associated with the scannable image. From within the user portal, the user can also view analytics insights associated with the scannable images. Further details of the portal system are described below.

Networked Computing Environment

Figure 1:
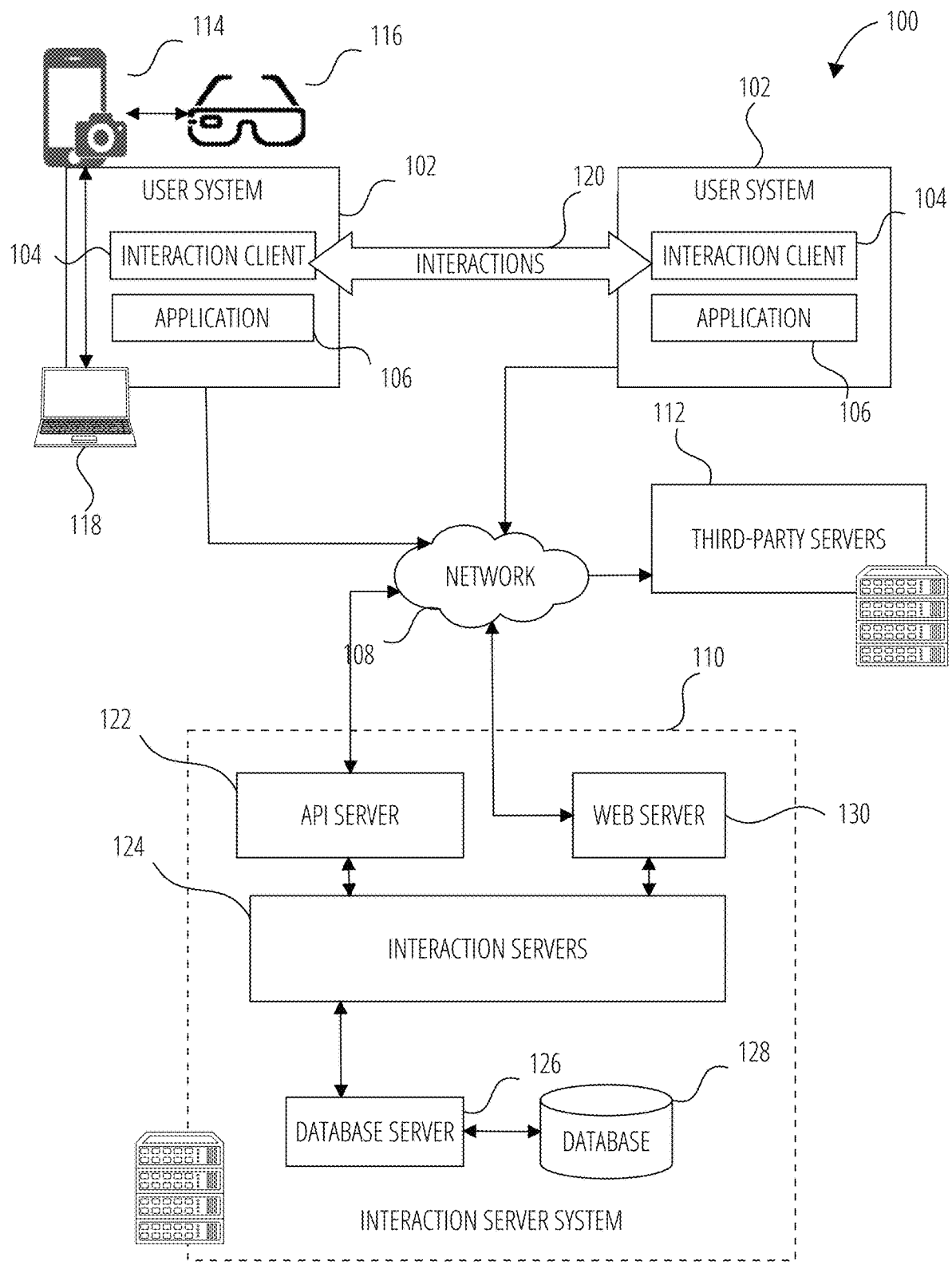
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple client systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
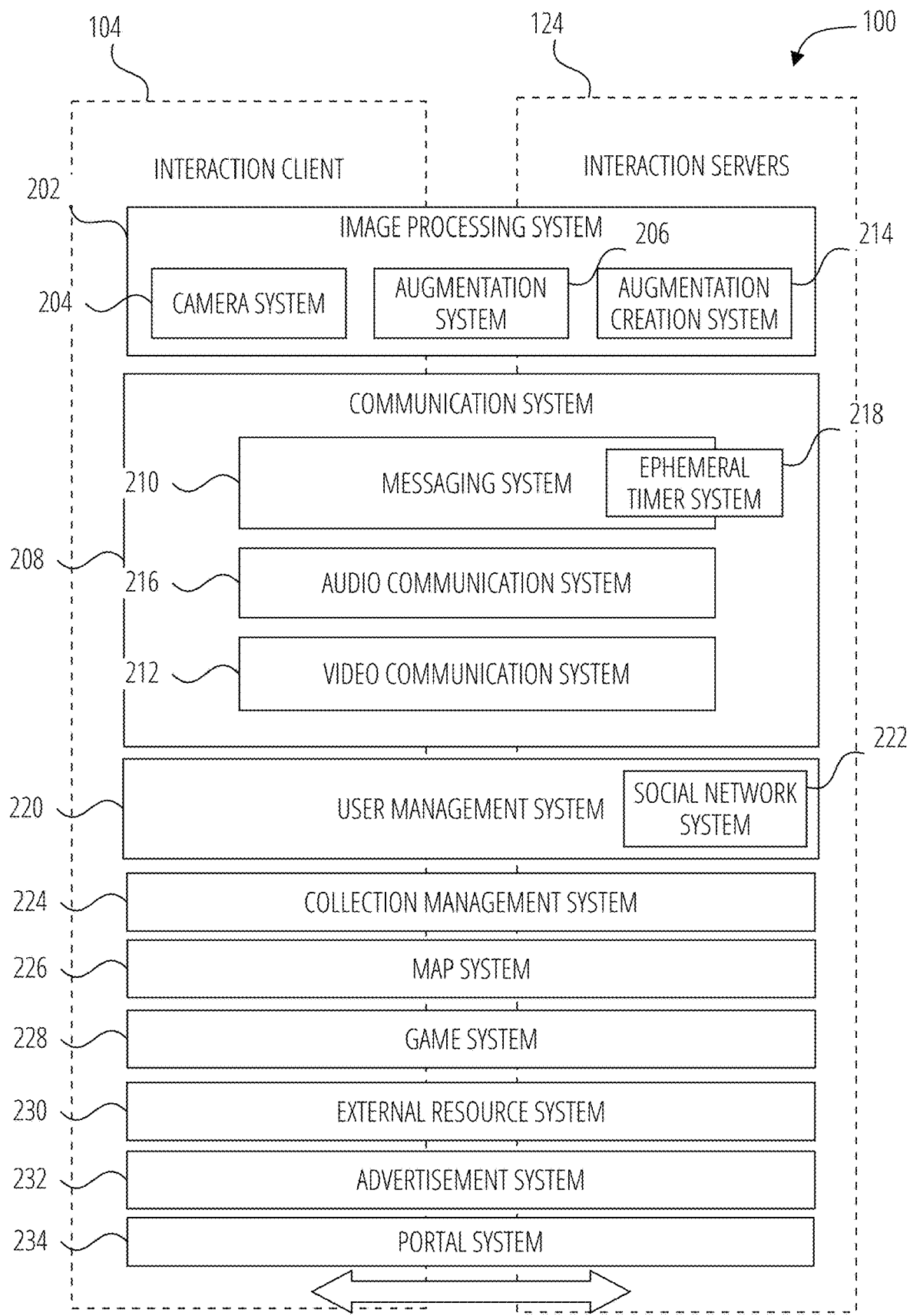
FIG. 2 is a diagrammatic representation of a messaging system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 902 of a user system 102. These augmentations are selected by the augmentation system 206 and presented to a user of an interaction client 104, based on a number of inputs and data, such as for example:

Geolocation of the user system 102; and
Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

The portal system 234 enables maintenance and management of a user portal on a social media platform (e.g., application 106). The portal system 234 receives login credentials from an interaction client 104 and authenticates the login credentials based on login data stored in a database (e.g., database 128). Upon authentication the portal system 234 causes display of a list of unlockable elements associated with the user portal. The unlockable elements are scannable images that may be scanned by a camera device to view various content, including but not limited to, websites, AR experiences (e.g., accessed from the augmentation creation system 214), games (e.g., accessed from the game system 228), user profiles (e.g., accessed from the user management system 220), and the like. The portal system 234 further allows users to modify one or more aspects of existing unlockable elements and generate new unlockable elements.

Data Architecture

Figure 3:
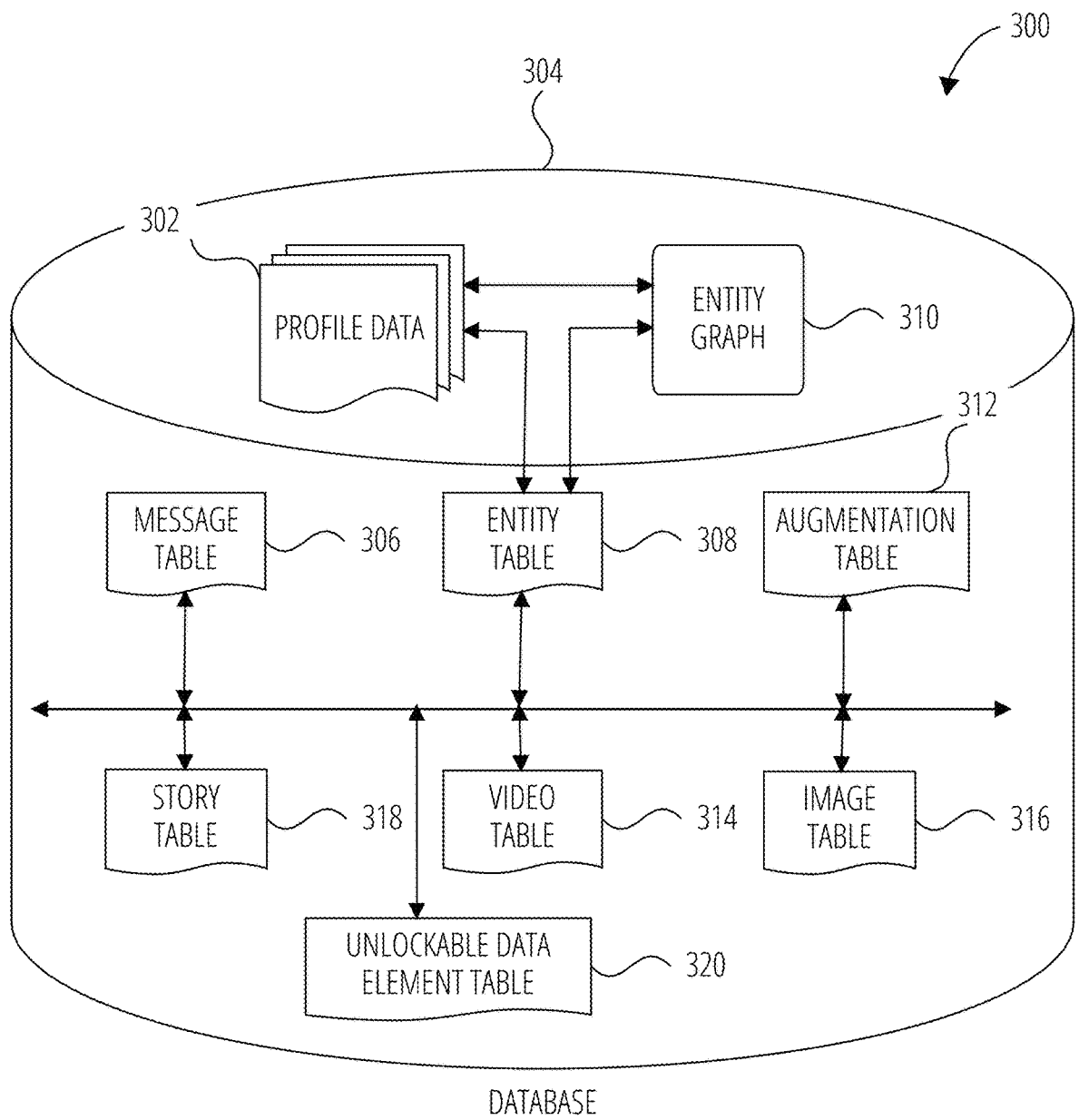
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100 or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a username, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include the unlockable data element table 320 that stores unlockable elements associated with various user portals within the portal system 234.

Data Communications Architecture

Figure 4:
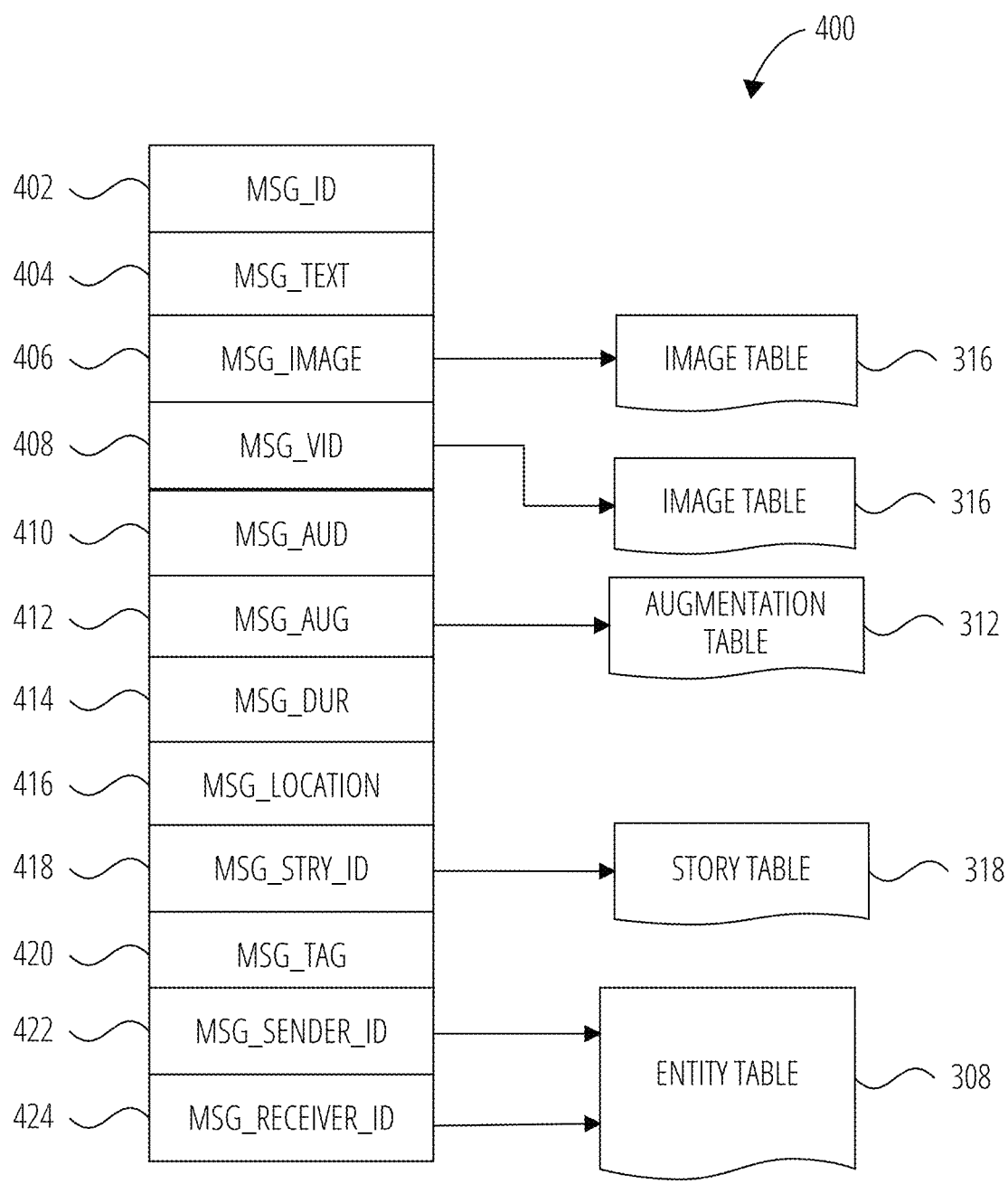
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

Figure 5:
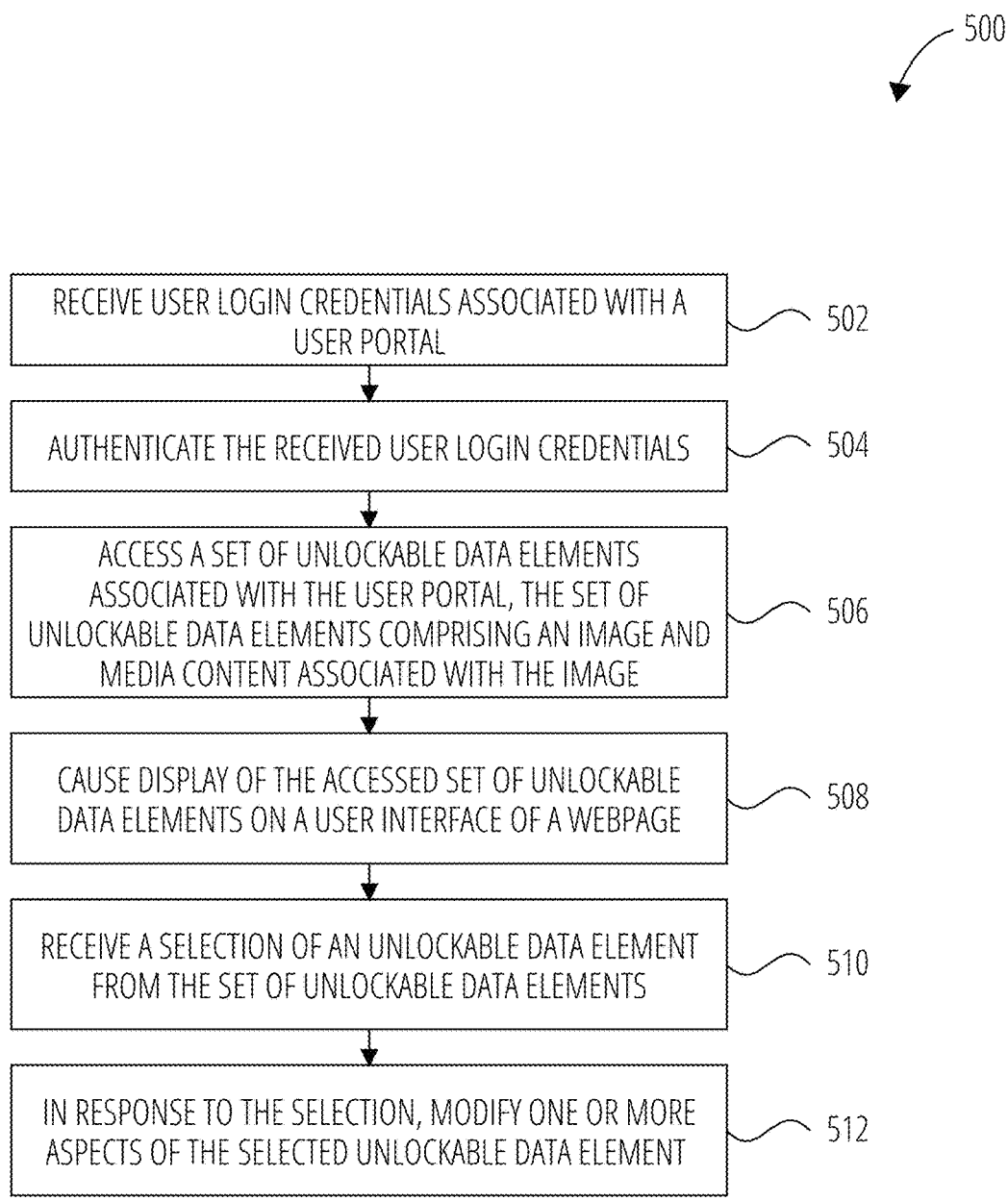
FIG. 5 illustrates process for modifying an unlockable data element from a user portal of a social media application, in accordance with some examples.

FIG. 5 illustrates a process 500 of modifying an unlockable data element from a user portal of a social media application, in accordance with one example. In one example, the processor in a portal system 234, the processor in an interaction client 104, the processor in the interaction server system 110 or any combination thereof, can perform the operations in process 500.

In operation 502, the portal system 234 receives, by a processor, user login credentials associated with a user portal. The user login credentials are associated with a user account of a social media application (e.g., social network system 222).

In operation 504, the portal system 234 authenticates, by the processor, the received user login credentials. For example, the portal system 234 may use a database of profile data 302 to authenticate the user login credentials.

In operation 506, the portal system 234 accesses a set of unlockable data elements associated with the user portal. The set of unlockable data elements comprises an image and media content associated with the image. The unlockable data elements are scannable images that upon being scanned, present the media content associated with the image. The media content may be a website, a user profile of the social media application, an augmented reality experience, a game, and the like.

In operation 508, the portal system 234 causes display of the accessed set of unlockable data elements on a user interface of a webpage. The set of unlockable data elements may be displayed in order based on the date of creation, where the most recently created unlockable data element is displayed first. In some examples, the set of unlockable data elements are grouped according to the type of content. For example, unlockable data elements associated with websites are in a first portion of the user interface, unlockable data elements associated with user profiles are in a second portion of the user interface, and unlockable data elements associated with augmented reality experiences, are in a third portion of the user interface. It is to be understood that any ordering scheme may be applied to the display of the set of unlockable data elements.

In operation 510, the portal system 234 receives a selection of an unlockable data element from the set of unlockable data elements. In operation 512, in response to the selection, the portal system 234 modifies one or more aspects of the selected unlockable data element. The modification may include modifying the image associated with the unlockable data element, modifying the type of content associated with the unlockable data element or modifying the data associated with the unlockable data element. Modifying the image, type of content or data associated with the unlockable data element includes replacing the original media, type of content or data with new media, type of content or data.

In some examples, each unlockable data element of the set of unlockable data elements is associated with an analytics icon that is displayed proximate to the display of the unlockable data element. Selection of the analytics icon causes display of analytics information associated with the respective unlockable data element. For example, the analytics information may include, total and unique number of scans, location data associated with the scans, user information associated with the scans, user device information associated with the scans, and the like.

In some examples, the portal system 234, receives second user login credentials associated with the user portal. The second user login credentials are associated with a second user account that is different from the user login credentials and user account described above. After authenticating the second user login credentials, the portal system 234 causes display of the accessed set of unlockable data elements associated with the user portal. Thus, multiple user login credentials (and associated user accounts) may have access to a single user portal. Each unlockable data element in the shared user portal may have further access restrictions. For example, a first user may only be allowed to modify a first unlockable data element but not a second unlockable data element. Thus, the access restrictions may be set on a user portal level and for each unlockable data element within a portal. Furthermore, a single user may have access to multiple user portals. For example, a user may have a private user portal that is only accessible by that user, and a shared user portal that can be accessed by a predefined group of users.

The portal system 234 may also be used to generate a new unlockable data element. The portal system 234 receives a selection from the webpage and accesses an image. The portal system 234 receives a subsequent selection of a user interface element that is associated with the type of content that the user wants to associate with the new unlockable data element. The portal system 234 receives data that comprises the selected type of content and generates an unlockable data element using the image and the received data. The portal system 234 stores the unlockable data element in association with the user portal (e.g., in an unlockable data element table 320).

The unlockable data element described above is generated on a first computer device (e.g., client device). A second client device that includes an image capture unit can scan the unlockable data element to access the media content associated with the unlockable data element.

In some examples, the portal system 234 includes an icon that is displayed proximate to the display of the unlockable data element. The icon may be selected to view analytics data associated with the unlockable data element. Further information of the user interfaces is provided below.

Figure 6:
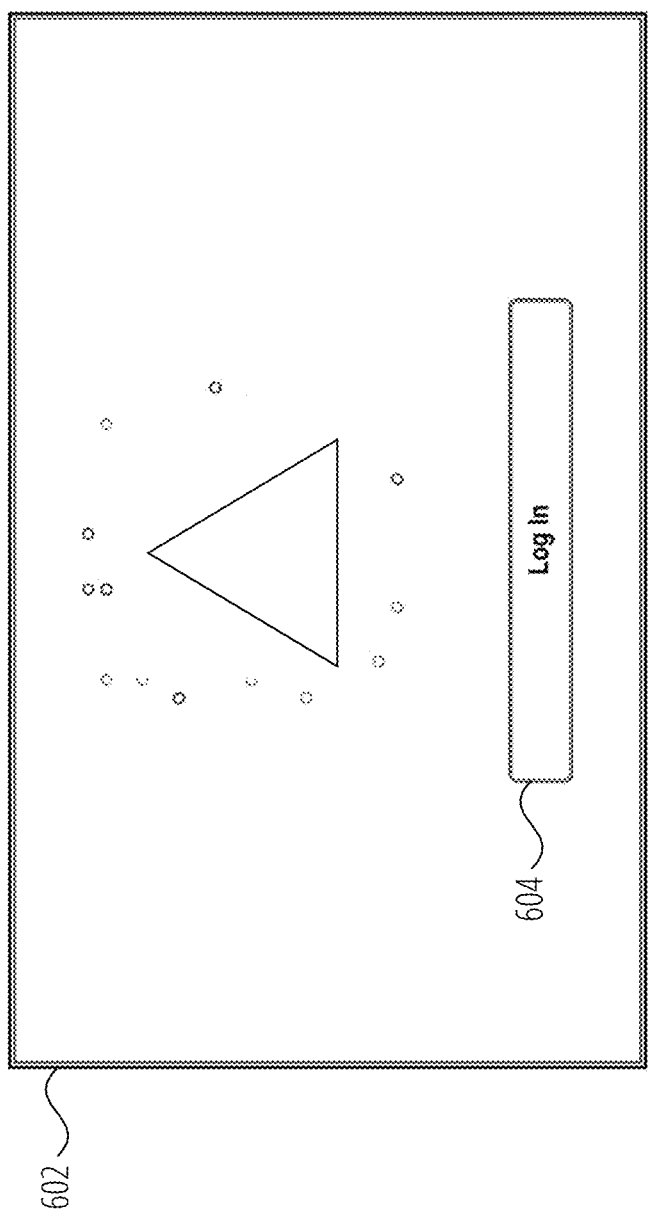
FIG. 6 is an illustration of a login screen for a portal system in accordance with some examples.

FIG. 6 is an example user interface 602 generated by the portal system 234. The user interface 602 is a login screen. Upon selection of the button 604, a user is prompted by the portal system 234 to enter their login credentials.

Figure 7:
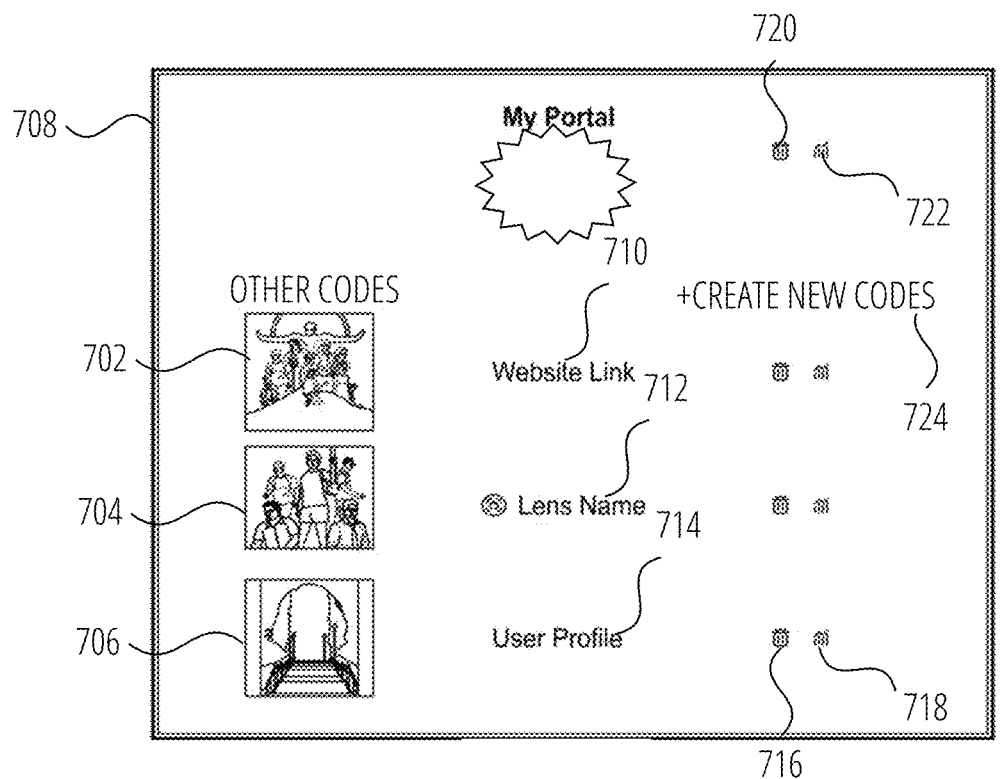
FIG. 7 is an illustration of a user portal interface generated by a portal system, according to some examples

FIG. 7 is an example user interface 708 generated by the portal system 234. The user interface 708 is an illustration of a user portal. The user portal includes various unlockable data elements (e.g., 702, 704, and 706). Each unlockable data element is associated with a name (e.g., (710, 712, and 714)). Each unlockable data element can be modified upon selection of the unlockable data element itself or the name associated with the unlockable data element. An unlockable data element can also be deleted upon selection of an icon (e.g., 716). The entire user portal can also be deleted upon selection of an icon (e.g., 720). Analytics insights associated with a specific unlockable data element can be viewed by selecting an icon (e.g., 718). Aggregate analytics insights associated with all the unlockable data elements in a user portal can be viewed by selecting an icon (e.g., 722). Furthermore, from within the user portal, a user can create a new unlockable data element by selecting a user interface element (e.g., 724).

Figure 8:
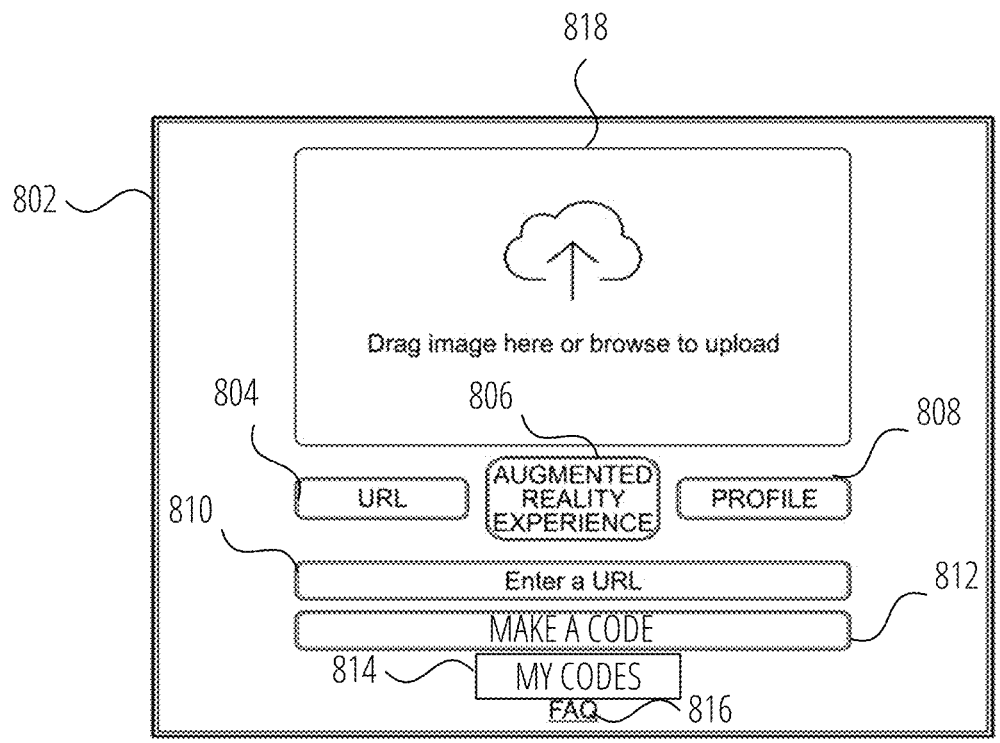
FIG. 8 is an illustration of an unlockable data element generation interface generated by a portal system, according to some examples.

After selection of user interface 724, the portal system 234 causes display of a user interface 802 for generating a new unlockable data element as shown in FIG. 8. In field 818, the user can upload an image to be used with the new unlockable data element. The user must also select the type of content to be associated with the image (e.g., a website URL 804, an augmented reality experience 806 (or an image overlay), or a user profile 808). If the user is creating a website URL 804 type unlockable data element, then they can enter the website address in field 810. If the user is creating an augmented reality experience 806 or a user profile 808, the user may be required to upload data from their computer client device 118 or any suitable location from where the data is stored. The portal system 234 also allows the user to navigate back to the user interface 708 upon selection of user interface element 814. Upon selection of user interface element 816, the user may view helpful information and guidelines for proper use of the portal system 234. Once the unlockable data element is generated, it is viewable from the user's user portal.

For example, if a user scanned an unlockable data element that is associated with a website URL 804, the user would be navigated to the URL on their client device. If a user scanned an unlockable data element that is associated with an AR experience 806, then the AR experience 806 would appear on their client device. If the unlockable data element is associated with a user profile 808, then upon scanning the unlockable data element, the user would be navigated to a user's profile within a social networking application.

System with Head-Wearable Apparatus

Figure 9:
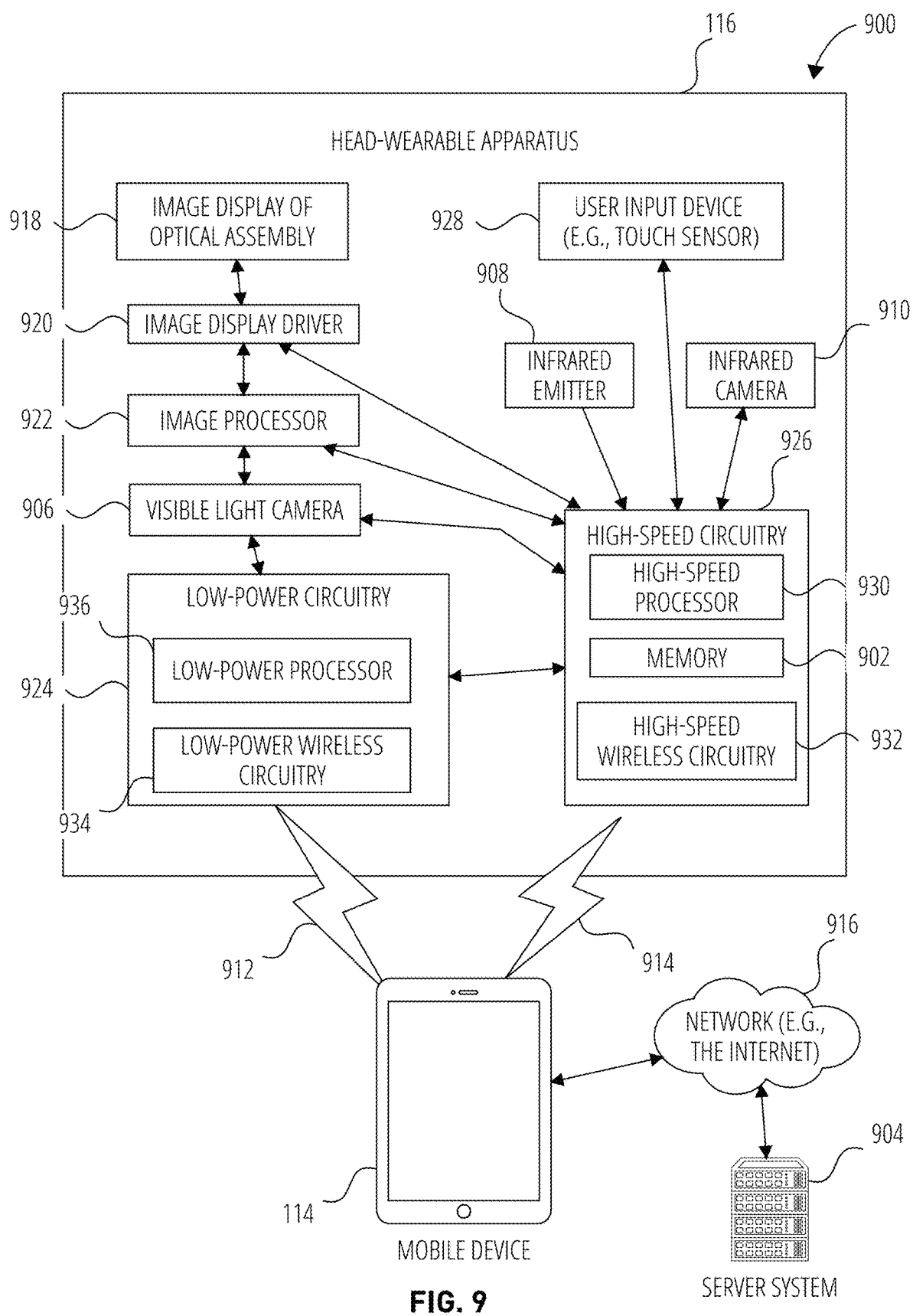
FIG. 9 illustrates a system in which the head-wearable apparatus, according to some examples.

FIG. 9 illustrates a system 900 including a head-wearable apparatus 116 with a selector input device, according to some examples. FIG. 9 is a high-level functional block diagram of an example head-wearable apparatus 116 communicatively coupled to a mobile device 114 and various server systems 904 (e.g., the interaction server system 110) via various networks 108.

The head-wearable apparatus 116 includes one or more cameras, each of which may be, for example, a visible light camera 906, an infrared emitter 908, and an infrared camera 910.

The mobile device 114 connects with head-wearable apparatus 116 using both a low-power wireless connection 912 and a high-speed wireless connection 914. The mobile device 114 is also connected to the server system 904 and the network 916.

The head-wearable apparatus 116 further includes two image displays of the image display of optical assembly 918. The two image displays of optical assembly 918 include one associated with the left lateral side and one associated with the right lateral side of the head-wearable apparatus 116. The head-wearable apparatus 116 also includes an image display driver 920, an image processor 922, low-power circuitry 924, and high-speed circuitry 926. The image display of optical assembly 918 is for presenting images and videos, including an image that can include a graphical user interface to a user of the head-wearable apparatus 116.

The image display driver 920 commands and controls the image display of optical assembly 918. The image display driver 920 may deliver image data directly to the image display of optical assembly 918 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 928 (e.g., touch sensor or push button), including an input surface on the head-wearable apparatus 116. The user input device 928 (e.g., touch sensor or push button) is to receive from the user an input selection to manipulate the graphical user interface of the presented image.

The components shown in FIG. 9 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 906 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 902, which stores instructions to perform a subset or all of the functions described herein. The memory 902 can also include storage device.

As shown in FIG. 9, the high-speed circuitry 926 includes a high-speed processor 930, a memory 902, and high-speed wireless circuitry 932. In some examples, the image display driver 920 is coupled to the high-speed circuitry 926 and operated by the high-speed processor 930 in order to drive the left and right image displays of the image display of optical assembly 918. The high-speed processor 930 may be any processor capable of managing high-speed communications and operation of any general computing system needed for the head-wearable apparatus 116. The high-speed processor 930 includes processing resources needed for managing high-speed data transfers on a high-speed wireless connection 914 to a wireless local area network (WLAN) using the high-speed wireless circuitry 932. In certain examples, the high-speed processor 930 executes an operating system such as a LINUX operating system or other such operating system of the head-wearable apparatus 116, and the operating system is stored in the memory 902 for execution. In addition to any other responsibilities, the high-speed processor 930 executing a software architecture for the head-wearable apparatus 116 is used to manage data transfers with high-speed wireless circuitry 932. In certain examples, the high-speed wireless circuitry 932 is configured to implement Institute of Electrical and Electronic Engineers (IEEE) 802.11 communication standards, also referred to herein as WiFi. In some examples, other high-speed communications standards may be implemented by the high-speed wireless circuitry 932.

The low-power wireless circuitry 934 and the high-speed wireless circuitry 932 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 912 and the high-speed wireless connection 914, may be implemented using details of the architecture of the head-wearable apparatus 116, as can other elements of the network 916.

The memory 902 includes any storage device capable of storing various data and applications, including, among other things, camera data generated by the left and right visible light cameras 906, the infrared camera 910, and the image processor 922, as well as images generated for display by the image display driver 920 on the image displays of the image display of optical assembly 918. While the memory 902 is shown as integrated with high-speed circuitry 926, in some examples, the memory 902 may be an independent standalone element of the head-wearable apparatus 116. In certain such examples, electrical routing lines may provide a connection through a chip that includes the high-speed processor 930 from the image processor 922 or the low-power processor 936 to the memory 902. In some examples, the high-speed processor 930 may manage addressing of the memory 902 such that the low-power processor 936 will boot the high-speed processor 930 any time that a read or write operation involving memory 902 is needed.

As shown in FIG. 9, the low-power processor 936 or high-speed processor 930 of the head-wearable apparatus 116 can be coupled to the camera (visible light camera 906, infrared emitter 908, or infrared camera 910), the image display driver 920, the user input device 928 (e.g., touch sensor or push button), and the memory 902.

The head-wearable apparatus 116 is connected to a host computer. For example, the head-wearable apparatus 116 is paired with the mobile device 114 via the high-speed wireless connection 914 or connected to the server system 904 via the network 916. The server system 904 may be one or more computing devices as part of a service or network computing system, for example, that includes a processor, a memory, and network communication interface to communicate over the network 916 with the mobile device 114 and the head-wearable apparatus 116.

The mobile device 114 includes a processor and a network communication interface coupled to the processor. The network communication interface allows for communication over the network 916, low-power wireless connection 912, or high-speed wireless connection 914. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 920. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 904, such as the user input device 928, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 912 and high-speed wireless connection 914 from the mobile device 114 via the low-power wireless circuitry 934 or high-speed wireless circuitry 932.

Machine Architecture

Figure 10:
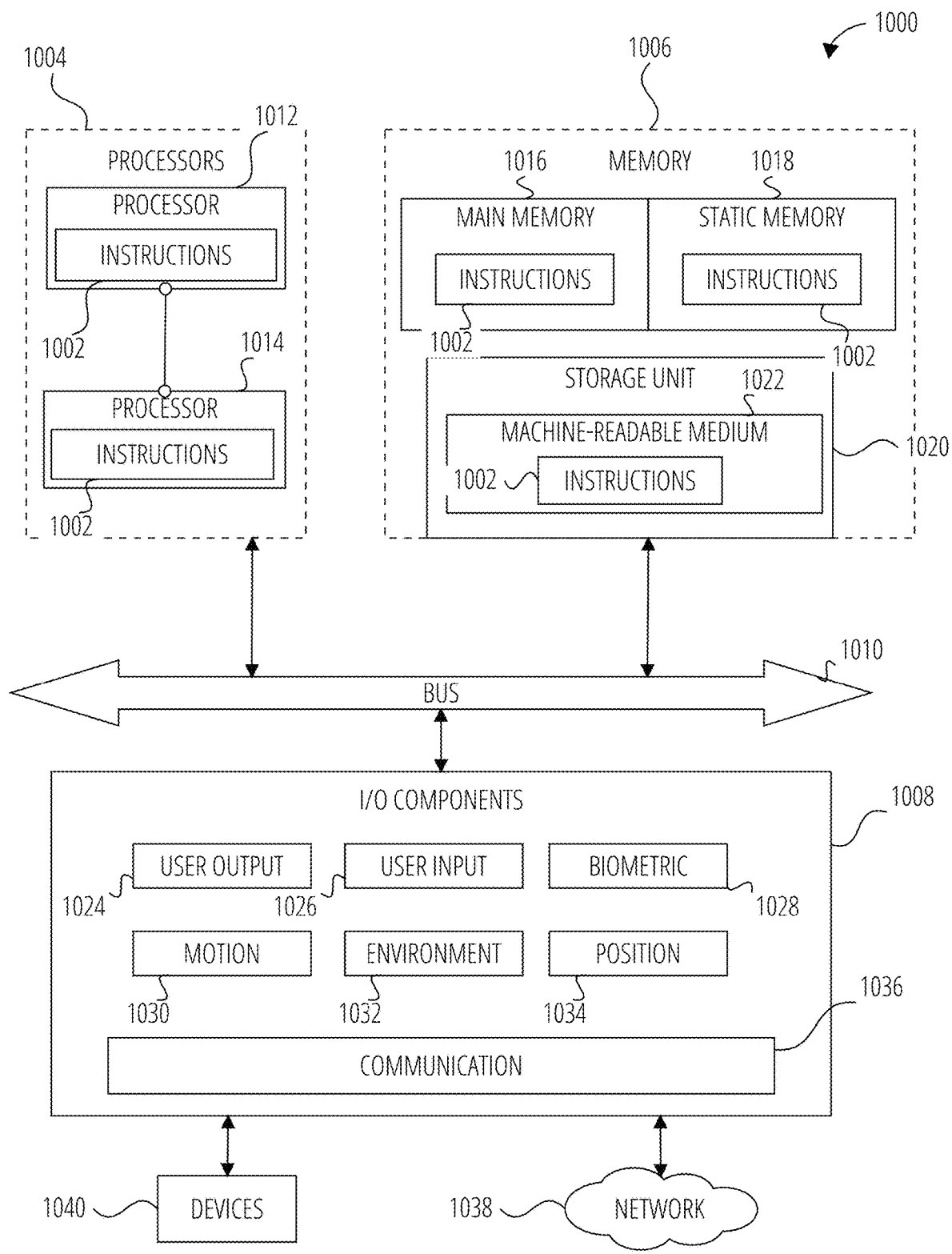
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
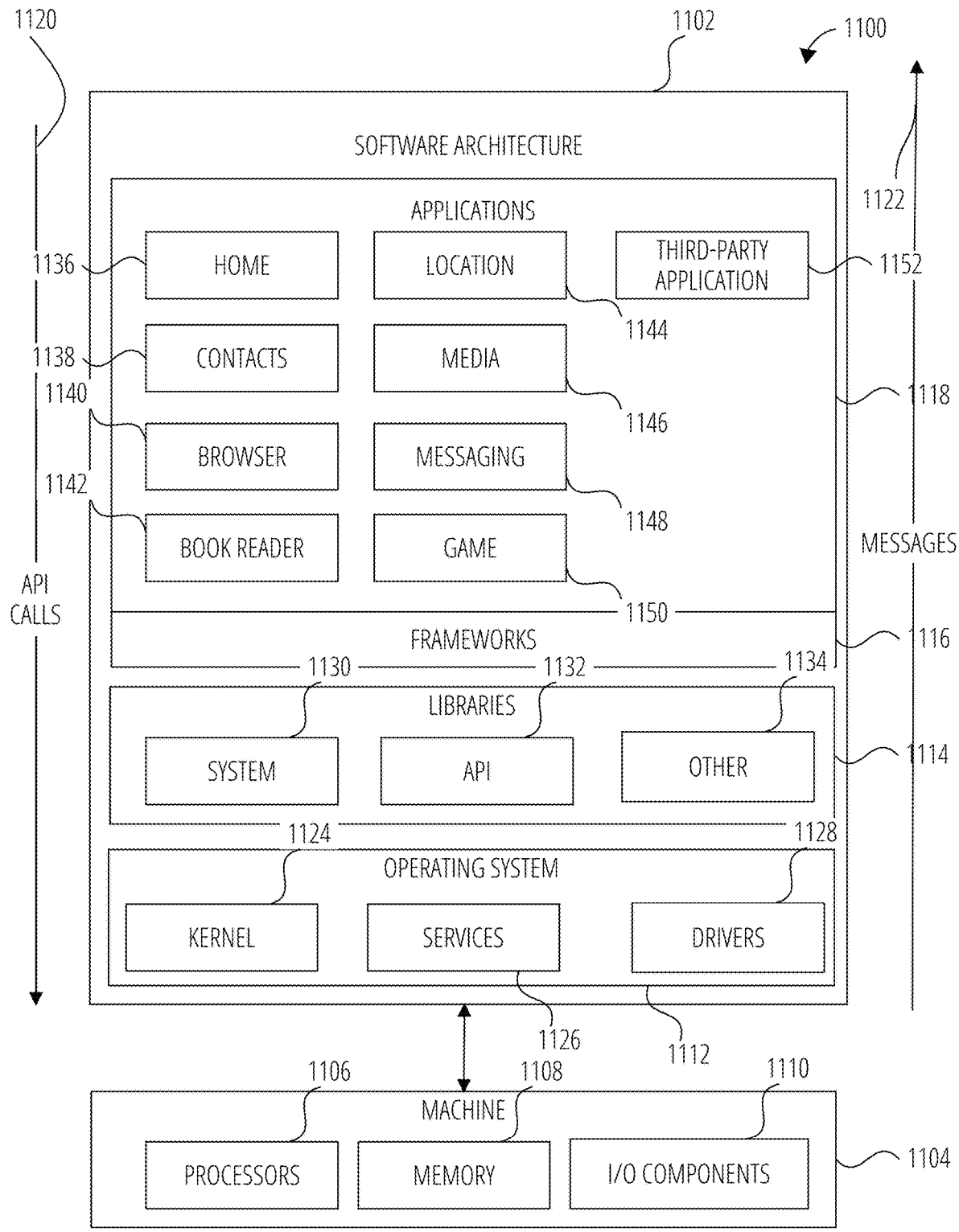
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

Conclusion

The portal system 234 allows for efficient creation and distribution of unlockable data elements. Multiple users with different user accounts may have access to a single shared user portal by way of unique login credentials. The various levels of access restrictions allow users to have control over entire user portals or for individual unlockable data elements within the user portals.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A method comprising:
    receiving, by a processor, user login credentials associated with a user portal;
    authenticating, by the processor, the received user login credentials;
    accessing a set of unlockable data elements associated with the user portal, the set of unlockable data elements comprising an image and media content associated with the image;
    causing display of the accessed set of unlockable data elements on a user interface of a webpage; and
    generating a new unlockable data element, the generating comprising:
        accessing a new image;
        receiving a subsequent selection of a user interface element from the webpage indicating a type of content;
        receiving data comprising the type of content; and
        associating the data and the new image with the new unlockable data element; and storing the new unlockable data element in association with the user portal.

2. The method of claim 1, further comprising:
    receiving a selection of an unlockable data element from the set of unlockable data elements; and
    in response to the selection, modifying one or more aspects of the selected unlockable data element.

3. The method of claim 2, wherein the image is an original image and wherein modifying the one or more aspects of the selected unlockable data element further comprises:
    accessing a new image;
    associating the new image with the data; and
    replacing the original image with the new image.

4. The method of claim 2, wherein the data is an original data and the type of content is a first type of content, and wherein modifying the one or more aspects of the selected unlockable data element, further comprises:
    accessing new data comprising a second type of content, the second type of content being different than the first type of content;
    associating the new data with the selected unlockable data element; and
    replacing the original data with the new data.

5. The method of claim 1, wherein the unlockable data element is configured to present the media content upon being scanned by a camera unit.

6. The method of claim 1, wherein the type of content comprises at least one of website, an augmented reality experience, or a user profile.

7. The method of claim 1, wherein the user login credentials are first user login credentials, the method further comprising:
receiving second user login credentials associated with the user portal;
authenticating the second user login credentials; and
causing display of the accessed set of unlockable data elements associated with the user portal.

8. The method of claim 1, further comprising:
receiving a selection of an icon displayed proximate to the selected unlockable data element; and
in response to the selection, causing display of analytics data associated with the selected unlockable data element.

9. A system comprising:
a processor; and
a memory storing instructions that, when executed by the processor, configure the system to perform operations comprising:
receiving user login credentials associated with a user portal;
authenticating the received user login credentials;
accessing a set of unlockable data elements associated with the user portal, the set of unlockable data elements comprising an image and media content associated with the image;
causing display of the accessed set of unlockable data elements on a user interface of a webpage; and
generating a new unlockable data element, the generating comprising:
accessing a new image;
receiving a subsequent selection of a user interface element from the webpage indicating a type of content;
receiving data comprising the type of content; and
associating the data and the new image with the new unlockable data element; and storing the new unlockable data element in association with the user portal.

10. The system of claim 9, wherein the instructions further configure the system to perform operations comprising:
receiving a selection of an unlockable data element from the set of unlockable data elements; and
in response to the selection, modifying one or more aspects of the selected unlockable data element.

11. The system of claim 10, wherein the image is an original image and wherein modifying the one or more aspects of the selected unlockable data element further comprises:
accessing a new image;
associating the new image with the data; and
replacing the original image with the new image.

12. The system of claim 10, wherein the data is an original data and the type of content is a first type of content, and wherein modifying the one or more aspects of the selected unlockable data element further comprises:
accessing new data comprising a second type of content, the second type of content being different than the first type of content;
associating the new data with the selected unlockable data element; and
replacing the original data with the new data.

13. The system of claim 9, wherein the unlockable data element is configured to present the media content upon being scanned by a camera unit.

14. The system of claim 9, wherein the type of content comprises at least one of a website, an augmented reality experience or a user profile.

15. The system of claim 9, wherein the user login credentials are first user login credentials, wherein the instructions further perform operations comprising:
receiving second user login credentials associated with the user portal;
authenticating the second user login credentials; and
causing display of the accessed set of unlockable data elements associated with the user portal.

16. The system of claim 9, wherein the instructions further perform operations comprising:
receiving a selection of an icon displayed proximate to the selected unlockable data element; and
in response to the selection, causing display of analytics data associated with the selected unlockable data element.

17. A non-transitory computer-readable storage medium, the computer-readable storage medium including instructions that, when executed by a computer, cause the computer to perform operations comprising:
receiving user login credentials associated with a user portal;
authenticating the received user login credentials;
accessing a set of unlockable data elements associated with the user portal, the set of unlockable data elements comprising an image and media content associated with the image; and
causing display of the accessed set of unlockable data elements on a user interface of a webpage;
generating a new unlockable data element, the generating comprising:
accessing a new image;
receiving a subsequent selection of a user interface element from the webpage indicating a type of content;
receiving data comprising the type of content; and
associating the data and the new image with the new unlockable data element; and storing the new unlockable data element in association with the user portal.

18. The computer-readable storage medium of claim 17, wherein the instructions further perform operations comprising:
receiving a second selection from the webpage;
in response to the second selection, accessing a second image;
receiving a third selection of a user interface element from the webpage, the user interface element associated with a type of content;
receiving data comprising the type of content;
generating a second unlockable data element using the second image, the second image associated with the data; and
storing the second unlockable data element in association with the user portal.

19. The computer-readable storage medium of claim 17, wherein the unlockable data element is a scannable image.

20. The computer-readable storage medium of claim 19, wherein the scannable image is created by a first user device, the instructions further perform operations comprising:

receiving an indication that the scannable image is scanned by a second user device, the second user device being different from the first user device.

\* \* \* \* \*